(12) United States Patent
Djunaidi et al.

(10) Patent No.: US 8,394,227 B2
(45) Date of Patent: Mar. 12, 2013

(54) SURFACE-COATING MATERIAL, FLEXIBLE LAMINATE WITH A SUBSTRATE AND A LAYER OF SURFACE-COATING MATERIAL APPLIED THERETO, AND USE THEREOF

(75) Inventors: Terry Djunaidi, Leonberg (DE); Helge Warta, Ditzingen (DE)

(73) Assignee: Karl Wörwag Lack-und Farbenfabrik GmbH & Co. KG (DE)

( * ) Notice: Subject to any disclaimer, the term of this patent is extended or adjusted under 35 U.S.C. 154(b) by 376 days.

(21) Appl. No.: 12/674,203

(22) PCT Filed: Aug. 18, 2008

(86) PCT No.: PCT/EP2008/006765
§ 371 (c)(1),
(2), (4) Date: Apr. 26, 2010

(87) PCT Pub. No.: WO2009/024310
PCT Pub. Date: Feb. 26, 2009

(65) Prior Publication Data
US 2011/0200818 A1   Aug. 18, 2011

(30) Foreign Application Priority Data
Aug. 20, 2007  (DE) .................. 10 2007 040 376

(51) Int. Cl.
| | |
|---|---|
| *B29C 65/00* | (2006.01) |
| *B32B 37/00* | (2006.01) |
| *B32B 38/10* | (2006.01) |
| *C04B 37/00* | (2006.01) |
| *B05D 5/00* | (2006.01) |
| *C08G 18/42* | (2006.01) |
| *C08F 2/08* | (2006.01) |

(52) U.S. Cl. ........ 156/325; 156/247; 427/256; 524/500; 524/850

(58) Field of Classification Search ................... 156/247, 156/325; 427/256; 524/500, 850
See application file for complete search history.

(56) References Cited

U.S. PATENT DOCUMENTS

| | | |
|---|---|---|
| 6,221,439 B1 | 4/2001 | Negele et al. |
| 6,500,876 B2 | 12/2002 | Weikard et al. |
| 6,617,413 B1 | 9/2003 | Bruchmann et al. |
| 6,747,081 B2 | 6/2004 | Starnes |
| 2007/0123613 A1 | 5/2007 | Weikard et al. |
| 2008/0102215 A1 | 5/2008 | Weikard et al. |
| 2008/0145563 A1 | 6/2008 | Helschkel et al. |
| 2008/0146691 A1 | 6/2008 | Kruger et al. |
| 2008/0220250 A1 | 9/2008 | Ortmeier et al. |
| 2009/0298961 A1 | 12/2009 | Baumgart et al. |

FOREIGN PATENT DOCUMENTS

| | | |
|---|---|---|
| DE | 100 33 697 | 1/2002 |
| DE | 10 2004 055363 A1 | 11/2005 |
| DE | 10 2005 049520 A1 | 5/2006 |
| DE | 10 2005 008 932 | 8/2006 |
| DE | 10 2005 057 245 | 6/2007 |
| EP | 0 361 351 A2 | 4/1990 |
| EP | 0 819 520 A2 | 1/1998 |
| EP | 1 138 710 A1 | 10/2001 |
| EP | 1 790 673 A1 | 5/2007 |
| WO | 00/13893 A1 | 3/2000 |
| WO | 00/39183 | 7/2000 |
| WO | 2005/080484 A1 | 9/2005 |
| WO | 2005/099943 A2 | 10/2005 |
| WO | 2006/067003 | 6/2006 |

*Primary Examiner* — Michael Orlando
(74) *Attorney, Agent, or Firm* — DLA Piper LLP (US)

(57) ABSTRACT

A surface-coating material includes a double-bond-containing, OH-functional component A and a double-bond-containing, NCO-functional component B, having the following properties: Component A: solids fraction between 30% and 100% by weight, double-bond density between 2 eq/kg and 5 eq/kg (at a solids fraction of 100%), and OH content between 4% and 7% by weight, and Component B: solids fraction between 30% and 100% by weight, double-bond density between 1 eq/kg and 4 eq/kg (at a solids fraction of 100%), and NCO content of between 4% and 7% by weight.

7 Claims, No Drawings

SURFACE-COATING MATERIAL, FLEXIBLE LAMINATE WITH A SUBSTRATE AND A LAYER OF SURFACE-COATING MATERIAL APPLIED THERETO, AND USE THEREOF

RELATED APPLICATIONS

This is a §371 of International Application No. PCT/EP2008/006765, with an international filing date of Aug. 18, 2008 (WO 2009/024310 A2, published Feb. 26, 2009), which is based on German Patent Application No. 10 2007 040 376.5, filed Aug. 20, 2007, the subject matter of which is incorporated by reference.

TECHNICAL FIELD

This disclosure relates to a surface-coating material having a double-bond-containing, OH-functional component A, a double-bond-containing, NCO-functional component B, and, if desired, a double-bond-containing component C, to a laminate featuring such a surface-coating material, to the use of the surface-coating material and of the laminate in the production of surface-coated substrates, and to a surface-coating method.

BACKGROUND

From automobile manufacture it is known to make use of, in place of conventional finishes, multilayer assemblies featuring a layer of curable surface-coating material applied to a carrier for the coating of bodywork parts. Mention may be made in particular of what are called "dry-paint films," in which the carrier is a film. The application of these dry-paint films produces a finish having a color which is independent of substrate and of process, and this may considerably simplify the management of color quality. A further advantage associated with the use of dry-paint films is that their application entails virtually no solvent emissions. Dry-paint films suitable for the automobile segment are known from WO 00/13893, EP 361 351, and EP 0 819 520, for example.

DE 10 2004 055363 discloses dry-paint films comprising a carrier and at least one layer of curable surface-coating material applied to the carrier, the layer of curable surface-coating material comprising a double-bond-containing binder having a double-bond density between 3 mol/kg and 6 mol/kg, a glass transition temperature $T_g$ between −15° C. and 20° C., and with a solids fraction between 40% and 100%. After thermal drying, the layer of curable surface-coating material is not tacky. Applied preferably to the layer of curable surface-coating material is at least one removable protective layer, preferably a removable protective film.

It could therefore be helpful to provide new technical solutions to further simplify the surface-coating of substrates. It could be particularly helpful to provide a new surface-coating composition which can be flexibly deployed and which is suitable for the production of dry-paint films.

SUMMARY

We provide a surface-coating material including a double-bond-containing, OH-functional component A and a double-bond-containing, NCO-functional component B, having the following properties: Component A: solids fraction between 30% and 100% by weight, double-bond density between 2 eq/kg and 5 eq/kg (at a solids fraction of 100%), and OH content between 4% and 7% by weight, and Component B: solids fraction between 30% and 100% by weight, double-bond density between 1 eq/kg and 4 eq/kg (at a solids fraction of 100%), and NCO content between 4% and 7% by weight.

We also provide a cured or partially cured surface-coating material produced by curing or partially curing the surface-coating material.

We further provide a substrate at least partly coated with the surface-coating material.

We still further provide a flexible laminate with a carrier and at least one layer of the surface-coating material applied to the carrier.

We further yet provide a method of applying a surface-coating material to a substrate including areally contacting the layer of surface-coating material to the laminate with a surface of the substrate, and removing the carrier from the layer of surface-coating material.

We also further provide a method of applying a surface-coating material to a substrate including applying a layer of adhesive to the substrate, applying, on the carrier side, the laminate to the substrate, and, where necessary, removing a protective layer.

DETAILED DESCRIPTION

Certain features in the text below are detailed only in the context of the description of representative examples. Independently of this, however, the corresponding description is intended to apply and extend beyond those selected descriptions and examples. The wording of all the claims is hereby incorporated by reference into the content of this description.

Our surface-coating material comprises a double-bond-containing, OH-functional component A, a double-bond-containing, NCO-functional component B, and, if desired, a double-bond-containing component C, which is different from A and B. The three components more particularly have the following properties:

Component A
    solids fraction between 30% and 100% by weight,
    double-bond density between 2 eq/kg and 5 eq/kg, more particularly between 3 eq/kg and 4 eq/kg (at a solids fraction of 100%), and
    OH content between 4% and 7% by weight Component B
    solids fraction between 30% and 100% by weight,
    double-bond density between 1 eq/kg and 4 eq/kg, more particularly between 1 eq/kg and 2 eq/kg (at a solids fraction of 100%), and
    NCO content between 4% and 7% by weight Component C
    glass transition temperature $T_g$ between −10° C. and 20° C., more particularly between −5° C. and 5° C.,
    solids fraction between 30% and 100% by weight, and
    double-bond density between 3 mol/kg and 6 mol/kg, more particularly between 4 mol/kg and 4.5 mol/kg (at a solids fraction of 100%).

Component A preferably has a glass transition temperature $T_g$ between 8° C. and 20° C., more particularly between 12° C. and 15° C.

Component B preferably has a glass transition temperature $T_g$ between 0° C. and 10° C., more particularly between 3° C. and 8° C.

Each of the components may have a fraction of solvent (up to 70% by weight; see above). In addition, at least one further solvent may be added to the surface-coating material.

As an optional constituent, the surface-coating material may further comprise one or more surface-coating auxiliaries, preferably a surface-coating auxiliary combination. Suitable surface-coating auxiliaries are described below.

The surface-coating material preferably has the following composition:
- between 5% and 15% by weight of component A,
- between 10% and 45% by weight of component B,
- between 0% and 35% by weight of component C,
- between 0% and 8% by weight of the at least one surface-coating auxiliary, and
- between 0% and 50% by weight of solvent.

It should be noted that the fractions add up to 100% by weight.

The at least one further solvent is more particularly an organic solvent. It preferably comprises at least one ester and/or at least one ketone. Particular suitability is possessed, for example, by butyl acetate or methyl isobutyl ketone (MIBK).

Component A is more particularly a binder based on a double-bond-containing polyol. Preference is given to double-bond-containing polyols having an average molecular weight Mn between 1000 Da and 10 000 Da.

Component B is based preferably on an aliphatic urethane acrylate. Urethane acrylates having an average molecular weight Mn between 1000 Da and 10 000 Da are particularly preferred.

As component C it is particularly preferred to use a binder based on a urethane acrylate, the urethane acrylate having more particularly an average molecular weight Mn between 1000 Da and 3000 Da, more particularly between 1400 Da and 2000 Da.

The at least one surface-coating auxiliary already addressed above may be any commercially customary auxiliary which is typically needed in the production of surface-coating materials (apart from the raw materials of the surface-coating material), more particularly auxiliaries which serve to set and stabilize the properties of surface-coating materials. Examples of such auxiliaries are photoinitiators such as, for example, α-hydroxyalkylphenones or acylphosphine oxides, light stabilizers such as commercially customary UV absorbers such as hydroxybenzophenones, benzotriazoles, oxanilides, and free-radical scavengers such as stearically hindered amines (HALS), surface additives such as flow-control agents and defoamers, emulsifiers, wetting agents, and dispersants.

Preferably, the surface-coating material may comprise pigments and/or fillers. Pigments which may be added include both organic and inorganic pigments. Fillers which are contemplated include all of the corresponding additives that are known to the skilled worker, such as silica gels or talc, for example. Preferably, however, the layer of curable surface-coating material is a clearcoat.

Any cured or partially cured surface-coating material produced or producible by curing or partially curing a surface-coating material, and also any substrate which is at least partly coated with a surface-coating material, are likewise included.

The cured surface-coating material has a high resistance toward chemicals such as, for example, sulfuric acid or aqueous sodium hydroxide. Ferments such as pancreatin generally do not cause damage to the surface of the surface-coating material either. The material is extraordinarily stable to weathering and highly suitable for outdoor applications. Furthermore, the cured surface-coating material possesses outstanding mechanical properties, more particularly a high scratch resistance. The degree of gloss can be set arbitrarily between matt and high gloss, a subject which will be addressed again later on.

In addition to the surface-coating material described, a flexible laminate having a carrier and at least one layer of the surface-coating material applied to the carrier.

Preferably, the laminate comprises as its carrier a film, more particularly a single-layer film or multilayer composite film.

With particular preference the carrier is composed substantially of plastic, more particularly of fluoropolymers such as ethylene-tetrafluoroethylene (ETFE), polyethylene terephthalate, polyolefin, polycarbonate, acrylonitrile-butadiene-styrene (ABS), acrylic-styrene-acrylonitrile (ASA), acrylonitrile-butadiene-styrene/polycarbonate (ABS/PC), acrylic-styrene-acrylonitrile/polycarbonate (ASA/PC), polyacrylate, polystyrene, polycarbonate/polybutylene terephthalate (PC/PBT) and/or polymethyl methacrylate.

Prior to the application of the at least one layer of surface-coating material to the carrier, the surface of the carrier may be subjected to an activating pretreatment, such as a corona treatment, for example.

It may be particularly advantageous to configure the carrier in such a way that it is light-transmissive and/or UV-transmissive. With such a configuration it is then possible, for example, to illuminate or to irradiate layers situated below or on the carrier through the carrier.

As a carrier it is preferred to select a film having a thickness in the range between 10 μm and 1500 μm, more particularly between 10 μm and 200 μm.

In some cases it may be preferable for the carrier to comprise pigments, and in particular to be colored. In addition or instead, the carrier may comprise commercially customary fillers. In general, however, the carrier is colorless.

The carrier side/surface facing the layer of surface-coating material is generally of either structured or smooth formation. In the former case, the structure of the carrier is transferred to a layer of surface-coating material when that layer is applied, and this can be used to produce matted or effect-imparting finishes. This will be addressed in more detail below.

The surface-coating material is curable both by radiation and also thermally. Preferably, the layer of surface-coating material is at least partly cured, more particularly preliminarily thermally cured. In the case of thermal curing, solvent present in the surface-coating material is essentially completely removed. In this case, furthermore, on thermal curing, the OH-functional component A crosslinks with the double-bond-containing, NCO-functional component B.

This may be followed by a radiation cure, the radiation to be employed being preferably more particularly UV radiation. The use of electron radiation is also possible.

The layer of surface-coating material preferably has a thickness between 15 μm and 80 μm (following complete curing).

Preferably, the laminate comprises at least one layer having color-imparting and/or effect-imparting properties.

This layer having color-imparting and/or effect-imparting properties is, for example, a layer of a water-based surface-coating material. In principle a suitable surface-coating material of this kind, as a function of the processing operation, must be amenable to knifecoating, pouring, spraying and/or pumping.

With particular preference the at least one layer having color-imparting and/or effect-imparting properties is a polyurethane layer. The polyurethane layer is based more particularly on a binder having a solids fraction between 25% and 55% by weight.

The color-imparting and/or effect-imparting properties may be brought about, for example, by pigments. Suitable pigments are known.

Like the layer of the surface-coating material, preferably, the at least one layer having color-imparting and/or effect-imparting properties is also at least partly cured, more particularly preliminarily cured at least thermally.

The layer having color-imparting and/or effect-imparting properties preferably has a thickness between 5 µm and 40 µm (after complete curing).

Preferably, the laminate has the following layer sequence:
carrier,
at least one layer of a surface-coating material,
at least one layer having color-imparting and/or effect-imparting properties.

Particularly preferred laminates comprise at least one layer having color-imparting and/or effect-imparting properties, and this layer, moreover, has adhesive-bonding or adhesion-promoting properties, and is therefore also an adhesion layer.

Another preferred laminate has the following layer sequence:
carrier,
at least one layer having color-imparting and/or effect-imparting properties, and
at least one layer of a surface-coating material.

A laminate of this kind is intended more particularly for single-sided application, preferably to that side of the carrier that faces away from the applied layer of curable surface-coating material. Application is accomplished preferably by adhesive bonding or laminating, or else by injection back molding or foam backing.

The laminate is intended with particular preference for full-area application, although application to defined areas of a substrate is also possible.

The layer of the surface-coating material may have for example, a structured surface or a smooth surface. In the former case, it has a matte optical appearance while in the latter case it tends to have a reflecting appearance.

As a result of the low $T_g$ value of the components of the surface-coating material, there may in principle be a certain susceptibility to contamination, especially to dust, at least when the surface-coating material is still uncured. Accordingly, the laminate may have a removable protective layer, preferably a removable protective film, on the layer of the surface-coating material.

Like the carrier side/surface facing the layer of surface-coating material (see above), the protective layer side/surface facing the layer of surface-coating material may also be structured or smooth in its formation. Accordingly it is possible via the protective layer to transfer structures to the surface of the surface-coating material. For this purpose a corresponding negative and/or positive pattern may be worked onto the protective layer.

The removable protective layer as well may be either a single-layer film or a multi-layer film.

The removable protective layer may be a polymeric film, more particularly a film based on polyesters, polyolefins, polycarbonates, acrylonitrile-butadiene-styrene (ABS), acrylic-styrene-acrylonitrile (ASA), acrylonitrile-butadiene-styrene/polycarbonate (ABS/PC), acrylic-styrene-acrylonitrile/polycarbonate (ASA/PC), polycarbonate/polybutylene terephthalate (PC/PBT) or other suitable plastics known, or mixtures thereof. Particular preference is given to a protective layer based on polyethylene terephthalate.

In certain circumstances, however, the use of protective layers made of materials other than plastic, such as of metal or paper, for example, is also conceivable.

A useful protective layer preferably has a thickness between 10 µm and 100 µm, more particularly between 20 µm and 60 µm.

Like the carrier already described, preferably, the protective layer too may have a configuration such that it is light-transmissive and/or UV-transmissive.

In the cured state, generally speaking, the surface-coating material is no longer tacky. Following ultimate UV curing, the surface of the surface-coating material has a sufficient hardness, and so the laminate can be wound immediately. Even in the cured form, despite a high surface hardness, the surface-coating material has a high stretchability and a high flexibility. The high flexibility allows a wrapping operation on profiles with low radii. One test method for the flexural behavior is, for example, the mandrel flex test using mandrels with a graded diameter. Coated profiles are often bent, stretched, or stretch-bent. The laminate, too, must withstand this procedure. One method of describing this behavior is the elongation at break in a tensile test. A laminate preferably has an elongation at break of approximately 50%-80%, dependent more particularly on layer thickness, carrier, and substrate.

Also encompassed herein is the use of a surface-coating material or of a laminate for coating a substrate. The substrate may be, for example, a substrate made of plastic (e.g., PVC, PP, PC), metal, glass, veneer, foam and/or wood. With particular preference the substrate is a vehicle body or a part thereof, or a wooden, plastic or metal profile for the furniture, construction or automobile industry. For the surface lamination of boards and sheets, more particularly of wooden boards for the furniture industry, window profiles and aluminum parts and aluminum boards for facade construction, it is likewise possible to use a surface-coating material or a laminate.

We also provide a method of applying a surface-coating material to a substrate.

A first example of our method comprises:
areally contacting the layer of surface-coating material of a laminate comprising a carrier and at least one layer of surface-coating material applied to the carrier, more particularly of a laminate, with a surface of a substrate, and
removing the carrier from the layer of surface-coating material.

For this example, it is particularly preferred to use a laminate having the following layer sequence:
carrier,
at least one layer of a surface-coating material, and
at least one layer having color-imparting and/or effect-imparting properties.

The reason for this is that it has been found, surprisingly, that the carrier of a laminate can be detached from the layer of surface-coating material located on it, even if that layer has already been thermally and UV-cured, to give a high-quality surface-coating surface. In this example, accordingly, the carrier or the carrier film of the laminate serves only as a "transfer medium," by means of which the surface-coating material is "transferred" to a substrate.

It may be preferable, prior to the contacting of the layer of surface-coating material with the substrate, to apply a layer of adhesive, more particularly comprising polyurethane, to the substrate, more particularly when using the laminate which has no layer with color-imparting and/or effect-imparting properties that also has adhesion-promoting properties.

The layer of surface-coating material in the laminate may be cured both before and after application.

The curing of the surface-coating material is accomplished preferably thermally and/or by means of radiation, more particularly by means of UV radiation.

Where appropriate, the surface-coating material is irradiated through the carrier. Thus it is preferred to remove the carrier only after the layer of surface-coating material has been cured.

Structuring of the layer of surface-coating material may take place without problems, by means, for example, of a suitable carrier (see above).

Another example comprises:
applying a layer of adhesive to the substrate,
applying, on the carrier side, a laminate to the substrate,
where necessary, removing a protective layer.

This procedure is preferred particularly in the context of the surface lamination of boards and sheets, more particularly of wooden boards for the furniture industry, and in the context of the surface-coating of window profiles. In this example, the carrier film as well is transferred to the substrate, where it also remains.

For this example, it is particularly preferred to use a laminate having the following layer sequence:
carrier,
at least one layer having color-imparting and/or effect-imparting properties, and
at least one layer of a surface-coating material.

The at least one layer of a surface-coating material optionally can be left unstructured or can be structured. The structuring may take place, for example, by means of a suitable protective film (see above). Also conceivable besides this, however, is an alternative structuring treatment, by means, for example, of an embossing paper or an embossing roll. The degree of gloss can be tailored as a function of the degree and the nature of the structuring.

Further features are apparent from the example below. Certain features may be realized in each case alone or as two or more thereof in combination with one another for one example. Selected preferred features described serve merely for elucidation and for better understanding, and should in no way be considered as restrictive.

EXAMPLE

A surface-coating material was prepared by mixing of the following constituents:

| | |
|---|---|
| Component C: | 30% by weight |
| Urethane acrylate binder (solid) with glass transition temperature of 2° C. and double-bond density of 4 mol/kg | |
| Component A: | 10% by weight |
| Polyol, double-bond-containing, binder solid, OH content 5.7%, double-bond density of 3.5 eq/kg | |
| Irgacure 184 (photoinitiator) | 1% by weight |
| Irgacure 819 (photoinitiator) | 0.40% by weight |
| Tinuvin 400 (light stabilizer) | 0.70% by weight |
| Tinuvin 292 (light stabilizer) | 0.70% by weight |
| Tego Glide 435 (surface additive) | 2% by weight |
| Byk 051 (surface additive) | 2% by weight |
| Solvent | 23.2% by weight |
| Component B: | 30% by weight |
| Urethane acrylate, NCO-containing, binder solid, NCO content 5.4%, double-bond density of 1.5 eq/kg | |

The surface-coating composition was subsequently knife-coated onto a 100 µm thick film of polyethylene terephthalate. Drying at room temperature and subsequent thermal curing in an oven at 100° C. were followed by cooling at 23° C. for 1-5 minutes. The thickness of the resulting layer of surface-coating material was approximately 25 µm.

A thin polyurethane adhesive layer was applied to an aluminum profile. Subsequently the film of polyethylene terephthalate with the layer of surface-coating material applied thereto was applied via the surface-coating material side to the profile under gentle pressure. Following UV curing with an Hg cold light emitter (1000 to 7000 mJ/cm$^2$), the film of polyethylene terephthalate was removable without problems from the now surface-coated aluminum profile.

The invention claimed is:

1. A method of coating a substrate comprising applying a surface-coating material comprising a double-bond-containing, OH-functional component A and a double-bond containing, NCO-functional component B, having the following properties:
Component A
solids fraction between 30% and 100% by weight,
double-bond density between 2 eq/kg and 5 eq/kg (at a solids fraction of 100%), and
OH content between 4% and 7% by weight
Component B
solids fraction between 30% and 100% by weight,
double-bond density between 1 eq/kg and 4 eq/kg (at a solids fraction of 100%), and
NCO content between 4% and 7% by weight,
to the substrate.

2. The method according to claim 1, wherein the substrate is a substrate made of plastic, metal or wood.

3. A method of applying a surface-coating material to a substrate comprising:
areally contacting the layer of surface-coating material of a laminate with a carrier and at least one layer of surface-coating material comprising a double-bond-containing, OH-functional component A and a double-bond-containing, NCO-functional component 13, having the following properties:
Component A
solids fraction between 30% and 100% by weight,
double-bond density between 2 eq/kg and 5 eq/kg (at a solids fraction of 100%), and
OH content between 4% and 7% by weight
Component B
solids fraction between 30% and 100% by weight,
double-bond density between 1 eq/kg and 4 eq/kg (at a solids fraction of 100%), and
NCO content between 4% and 7% by weight,
applied to the carrier, with a surface of the substrate, and
removing the carrier from the layer of surface-coating material.

4. The method of claim 1, wherein, prior to contacting the layer of surface-coating material with the substrate, a layer of adhesive is applied to the substrate.

5. The method of claim 3, wherein the layer of surface-coating material is cured before and/or after application.

6. The method of claim 5, wherein the surface-coating material is cured thermally and by radiation.

7. A method of applying a surface-coating material to a substrate comprising:
applying a layer of adhesive to the substrate,
applying, on the carrier side, a laminate with a carrier and at least one layer of surface-coating material comprising a double-bond-containing, OH-functional component A and a double-bond-containing, NCO-functional component B, having the following properties:
Component A
solids fraction between 30% and 100% by weight,
double-bond density between 2 eq/kg and 5 eq/kg (at a solids fraction of 100%), and
OH content between 4% and 7% by weight Component B
- solids fraction between 10% and 100% by weight,
- double-bond density between 1 eq/kg and 4 eq/kg (at a solids fraction of 100%), and
- NCO content between 4% and 7% by weight, to the substrate,
and
where necessary, removing a protective layer.

* * * * *